United States Patent [19]

Houseman et al.

[11] 3,982,910
[45] Sept. 28, 1976

[54] HYDROGEN-RICH GAS GENERATOR

[75] Inventors: John Houseman, Pasadena; Donald J. Cerini, Flintridge, both of Calif.

[73] Assignee: The United States of America as represented by the Administrator of the National Aeronautics and Space Administration, Washington, D.C.

[22] Filed: July 10, 1974

[21] Appl. No.: 487,156

[52] U.S. Cl. ............................... 48/61; 23/281; 48/116; 48/117; 48/197 R; 48/212; 123/3; 252/373; 423/650; 431/11; 431/41; 431/116; 431/162; 431/170
[51] Int. Cl.² ........................................... B01J 7/00
[58] Field of Search ............... 48/116, 117, 118, 61, 48/63, 212, 197 R, 213; 23/281, 288 H, 288 K; 423/650; 123/1 A, 3; 252/373; 431/11, 41, DIG. 65, DIG. 68, 116, 162, 170

[56] References Cited
FOREIGN PATENTS OR APPLICATIONS
5,510/27  1/1927  Australia ........................... 48/212
296,785  12/1929  United Kingdom ................ 48/212

*Primary Examiner*—Robert L. Lindsay, Jr.
*Assistant Examiner*—George C. Yeung
*Attorney, Agent, or Firm*—Monte F. Mott; Wilfred Grifka; John R. Manning

[57] ABSTRACT

A process and apparatus are described for producing hydrogen-rich product gases by mixing a spray of liquid hydrocarbon with a stream of air in a startup procedure and the mixture is ignited for partial oxidation, then the stream of air is heated by the resulting combustion to reach a temperature such that a signal is produced. The signal triggers a two way valve which directs liquid hydrocarbon from a spraying mechanism to a vaporizing mechanism with which a vaporized hydrocarbon is formed. The vaporized hydrocarbon is subsequently mixed with the heated air in the combustion chamber where partial oxidation takes place and hydrogen-rich product gases are produced.

17 Claims, 10 Drawing Figures

HYDROGEN-RICH GAS GENERATOR

ORIGIN OF THE INVENTION

The invention described herein was made in the performance of work under a NASA contract and is subject to the provisions of section 305 of the National Aeronautics and Space Act of 1958, Public Law 85–568 (72 STAT. 435; 42USC457).

BACKGROUND OF THE INVENTION

This invention relates to means for generating hydrogen-rich gas and more particularly to improvements therein.

In an application for patent by J. Rupe entitled, "System for Minimizing Internal Combustion Engine Pollution Emission," Ser. No. 387,342 filed Aug. 10, 1973, and assigned to a common assignee, there is described an arrangement for minimizing the pollution produced by an internal combustion engine by mixing hydrogen with a very lean fuel/air mixture which is then injected into the engine to be used as the engine fuel. For the purpose of generating the hydrogen, in that application and in an application by Houseman et al, Ser. No. 390,049, filed Aug. 20, 1973, for a "Hydrogen-Rich Gas Generator," and also in an application by Houseman, Ser. No. 428,444, filed Dec. 26, 1973, for a "Hydrogen-Rich Gas Generator," all of which applications are assigned to a common assignee, there are described hydrogen generators of a type which are suitable for use with an automobile internal combustion engine. These hydrogen generators partially oxidize a spray of atomized liquid hydrocarbon fuel in an air-steam mixture, to produce a substantially soot-free hydrogen-rich gas. The use of steam and or water requires a water tank to be carried by the vehicle, whose size has been estimated on the order of five gallons. The additional cost of a water tank and the cost of providing service station facilities for refilling the tank with pure water represents a considerable investment. Also, in cold weather the addition of a suitable anti-freeze agent to the water and the use of heaters to prevent freezing of the water provides another complication which can be expensive. These complications may be avoided if it were possible to provide a hydrogen gas generator which does not require water or steam, and which can still produce either substantially or completely soot-free hydrogen-rich gas.

OBJECT AND SUMMARY OF THE INVENTION

An object of this invention is to provide a hydrogen-rich soot-free gas generator.

Yet another object of this invention is the provision of a novel and useful method and means for generating a soot-free hydrogen-rich gas from liquid hydrocarbon fuel.

Still another object of the invention is the provision of an improved construction for a hydrogen-rich gas generator.

Yet another object of this invention is the provision of a portable hydrogen-rich gas generator suitable for use with an automobile internal combustion engine.

The foregoing and other objects of the invention may be achieved in an arrangement wherein air, which is to be mixed with the fuel is preheated. The hydrocarbon fuel is vaporized and is then mixed with the preheated air. Thereafter, the mixture is ignited and partial oxidation is permitted. Further improvement is obtained by mixing a part of the product gas, which is obtained, with the preheated air which is being fed into the hydrogen generator. Alternative to the product gas, some of the lean engine exhaust gas may be mixed with the preheated air to improve the product yield.

Finally, and preferably, lower air fuel ratios are provided at lower operating temperatures by passing the products of the combustion chamber in the hydrogen reactor through a nickel catalyst bed where flameless partial oxidation of the fuel takes place on the surface of the catalyst to produce a hydrogen-rich gas.

The novel reactor itself is substantially cylindrical in shape having provision for preheating the incoming air with the outgoing product gas. By means of the novel fuel injection arrangement, while the generator is starting up, the hydrogen fuel is injected into the combustion chamber as a fine atomized spray. When the temperature of the preheated air indicates that the combustion chamber has reached a proper operating temperature, the heat of the combustion chamber is used to vaporize the liquid fuel which is thereafter mixed with the incoming air and product gas or exhaust gas.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
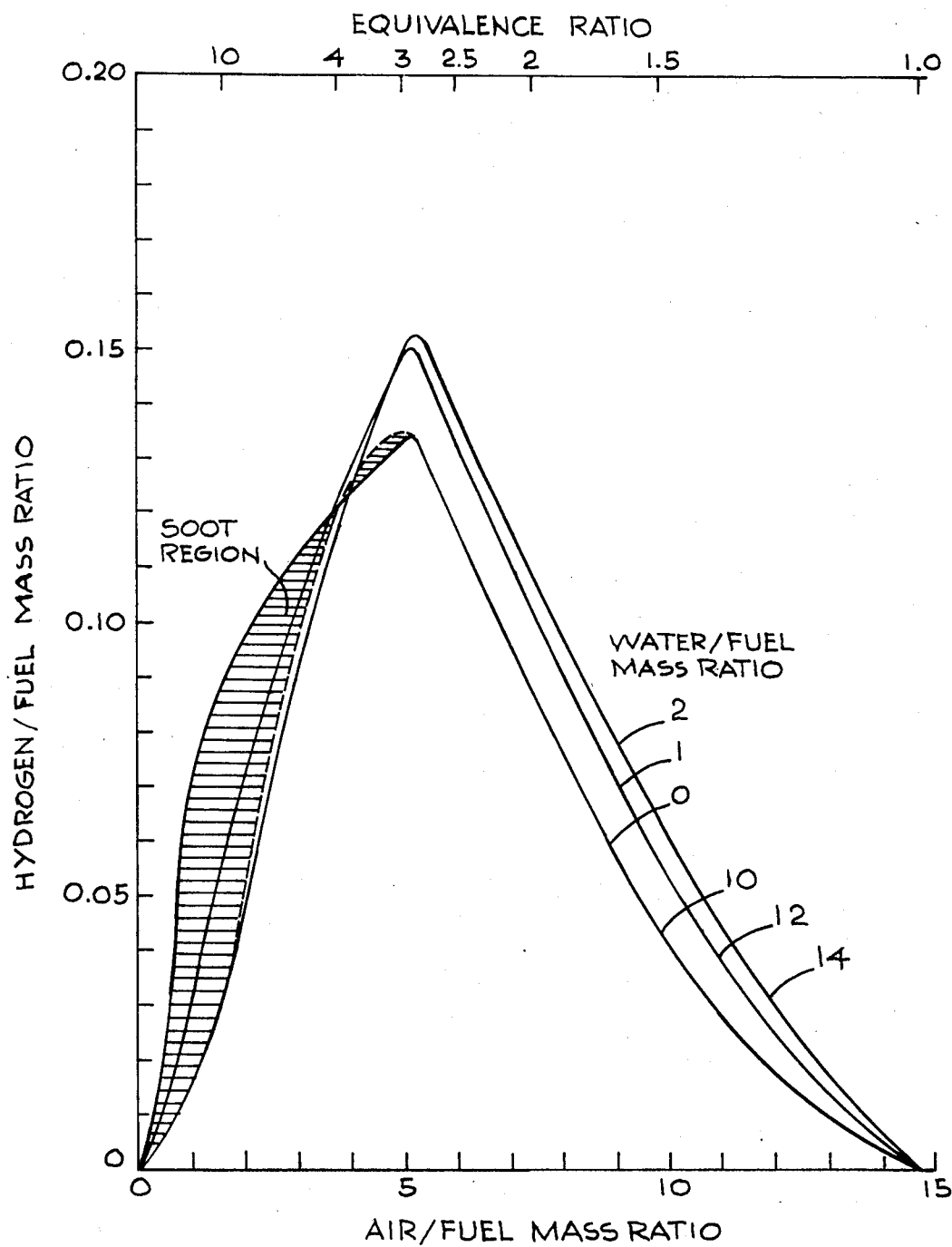
FIG. 1 is a curve illustrating the theoretical yield of hydrogen that can be obtained from the adiabatic combustion of mixtures of air, hydrocarbon and water.
Figure 2:
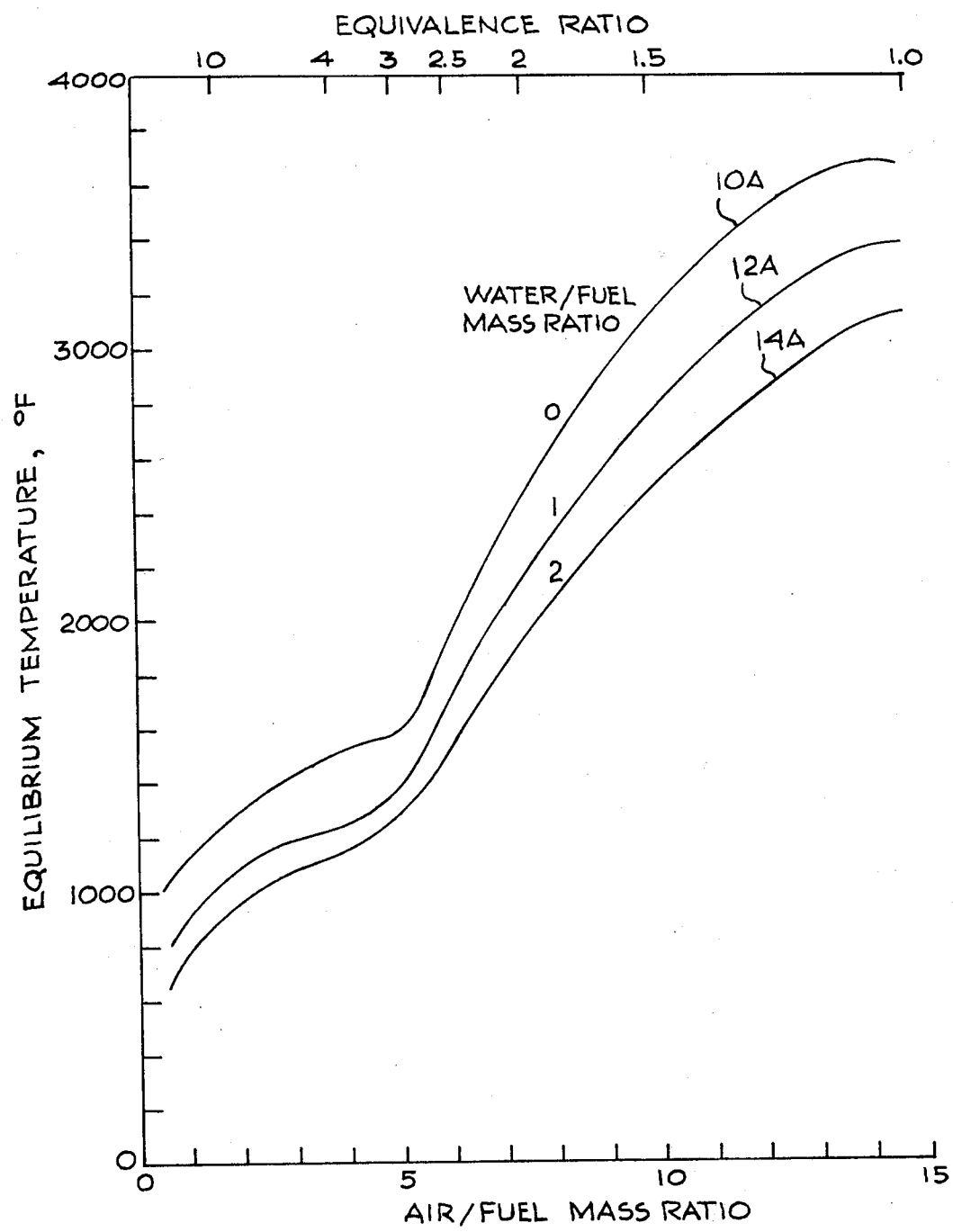
FIG. 2 are curves which show the adiabatic flame temperature as a function of the air/fuel mass ratio, and for water/fuel mass ratios of 0, 1 and 2.

FIG. 1 represents the theoretical yield of hydrogen which can be obtained from the adiabatic combustion of mixtures of air, hydrocarbon, and water. JP-5 fuel has been used in these calculations, since its hydrogen to carbon ratio (1.92) is about the same as for Indolene (Federal test gasoline). Diagrams for other hydrocarbon fuels are very similar. It should be realized that in actual practice the chemical kinetic rate of reaction may control the product formation. Chemical equilibrium thus represents only a goal which may or may not be achievable. The hydrogen yield in FIG. 4 is expressed as the mass of hydrogen produced per unit of mass of fuel, as a function of the air/fuel mass ratio and for water/fuel mass ratios of 0.1 and 2, and is represented by the respective curves 10, 12 and 14. The adiabatic flame temperature as a function of the same parameters is represented in FIG. 2 by curves respectively 10A, 12A and 14A. The curves in FIG. 3 show the distribution of the various species as a function of the air/fuel ratio when no water is added.

Figure 3:
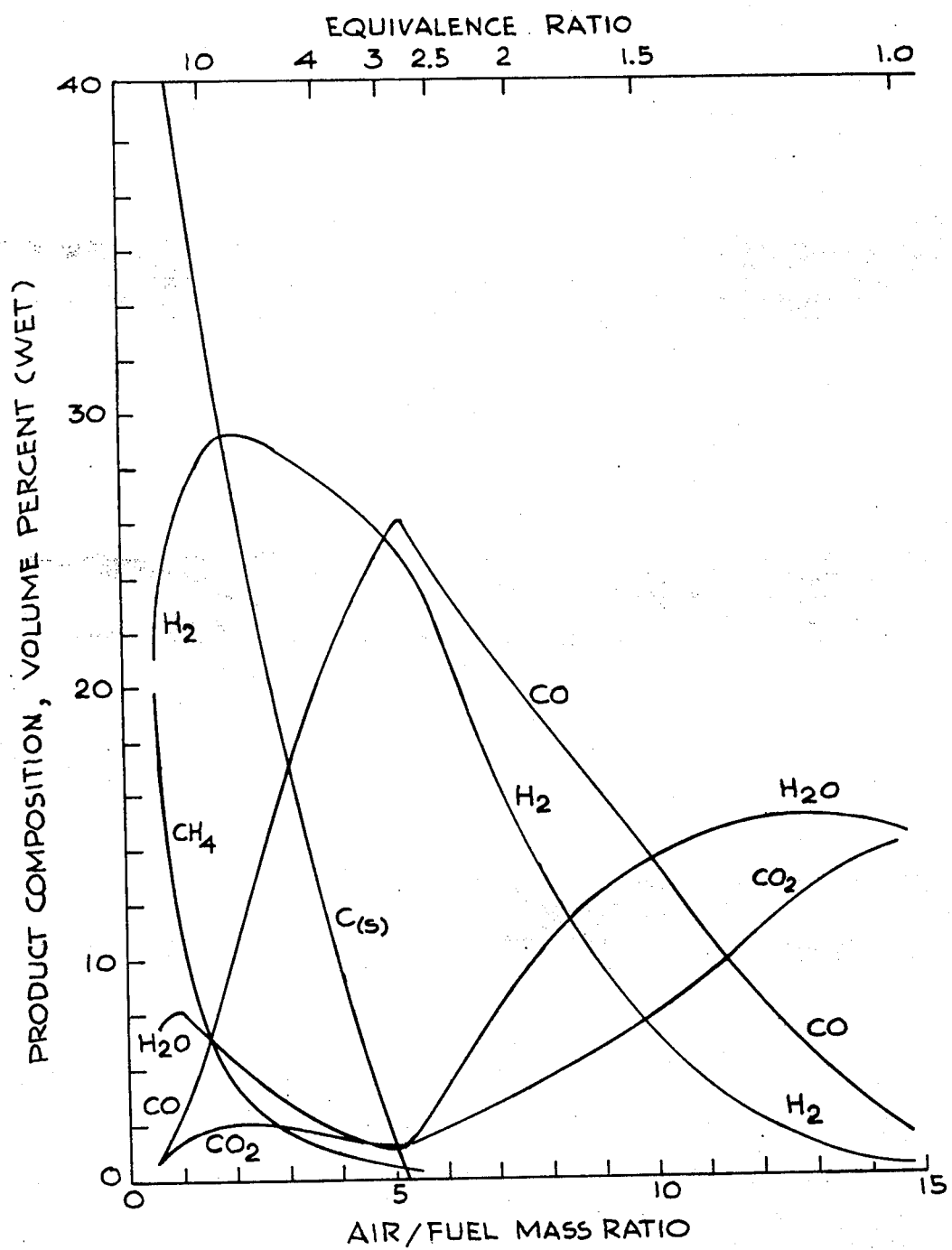
FIG. 3 is a set of curves showing the distribution of the various species as a function of the air/fuel ratio, when no water is added.
Figure 4:
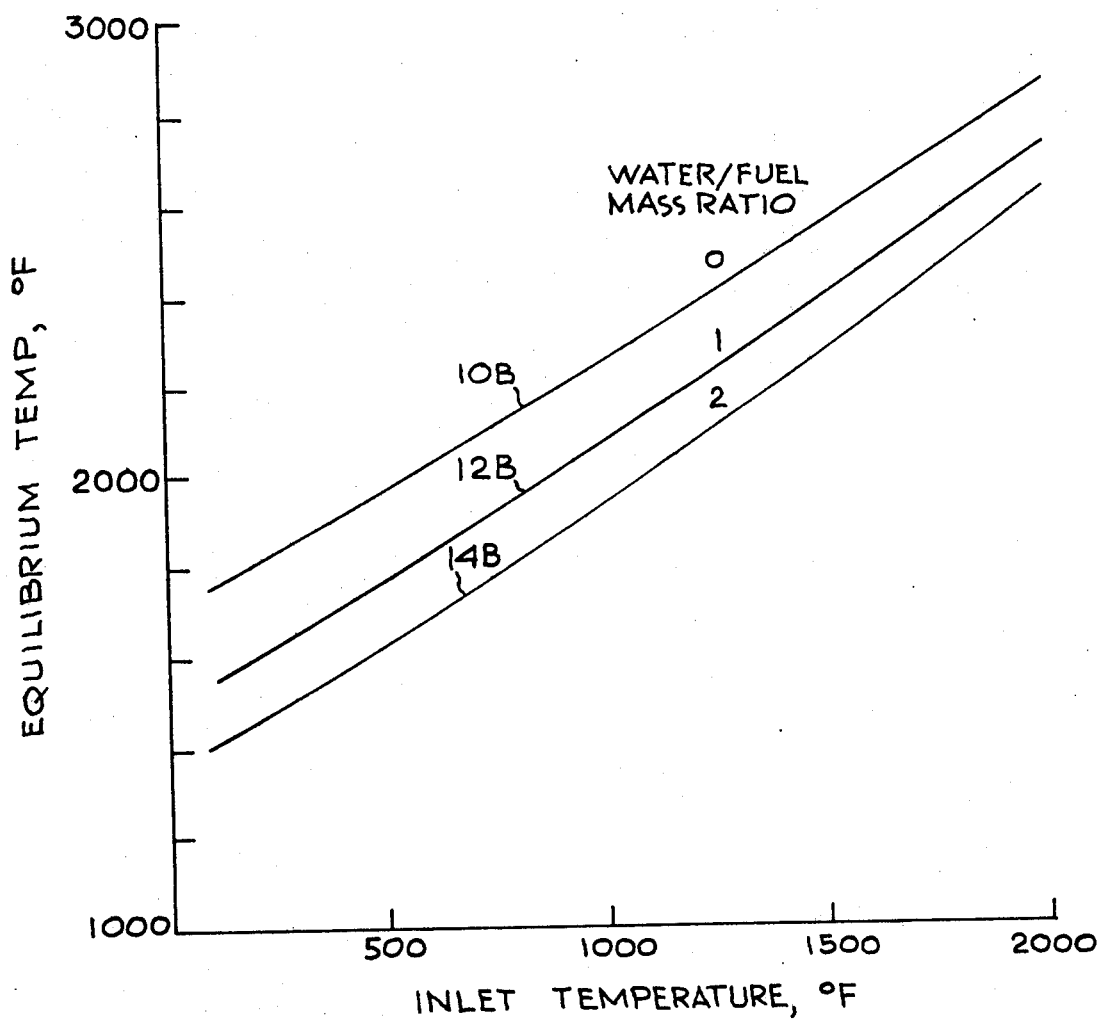
FIG. 4 is a series of curves showing the effect of the air preheat on the final equilibrium temperature.

As may be seen in FIGS. 1 and 3, for zero water addition, the hydrogen yield increases from zero stoichiometry with decreasing air/fuel ratios until it reaches a maximum at an air/fuel ratio of 5.15 (curve 10), where soot formation starts. Production of soot increases considerably at lower air/fuel ratios. The addition of water does not greatly increase the hydrogen yield, as may be seen from curves 12 and 14 in FIG. 1. Strictly on this basis, the considerable complexity of adding water does not seem warranted. However, the water addition does have a valuable function. It suppresses soot formation. For instance with a water-to-fuel ratio of 1, soot is only formed below an air/fuel ratio of 3.9, compared to a value of 5.15 without water. This soot suppression value of water addition is of importance when a spray of liquid droplets is being burned in the air. However this problem can be minimized by vaporizing the liquid hydrocarbon and thoroughly mixing it with the air before feeding the mixture to an ignition zone. This process assures a uniform air to fuel ratio for all of the fuel and it is what is carried out by this invention.

FIGS. 1, 2 and 3 represent the conditions when the reaction has gone to completion, i.e. equilibrium conditions have been reached. In practice, the rate at which a reaction proceeds toward equilibrium may be so slow that equilibrium will not be obtained in a finite time period. However, the rate of reaction often increases exponentially with temperature, and this is what happens with the partial oxidation of hydrocarbons. It has been found, that higher reaction temperatures result in a closer approach to equilibrium. Higher reaction temperatures, i.e. flame temperatures, can be obtained by preheating the air. Thus in the thermal reactors described subsequently, high air preheat is used to obtain high hydrogen yields. Another way to speed up the rate of a chemical reaction is to use a catalyst. This method was used in the catalytic reactor described later, in which high reaction rates and high hydrogen yields were obtained without the use of high temperatures. It has been found that the theoretical equilibrium product composition is hardly affected by the higher temperature. FIG. 4 shows three curves respectively, 10B, 12B and 14B for water/fuel mass ratio conditions such as are shown in FIG. 1, which show the change in equilibrium temperature with increase in inlet temperature. The effect of air preheat on the final equilibrium temperature is considerable.

Figure 5:
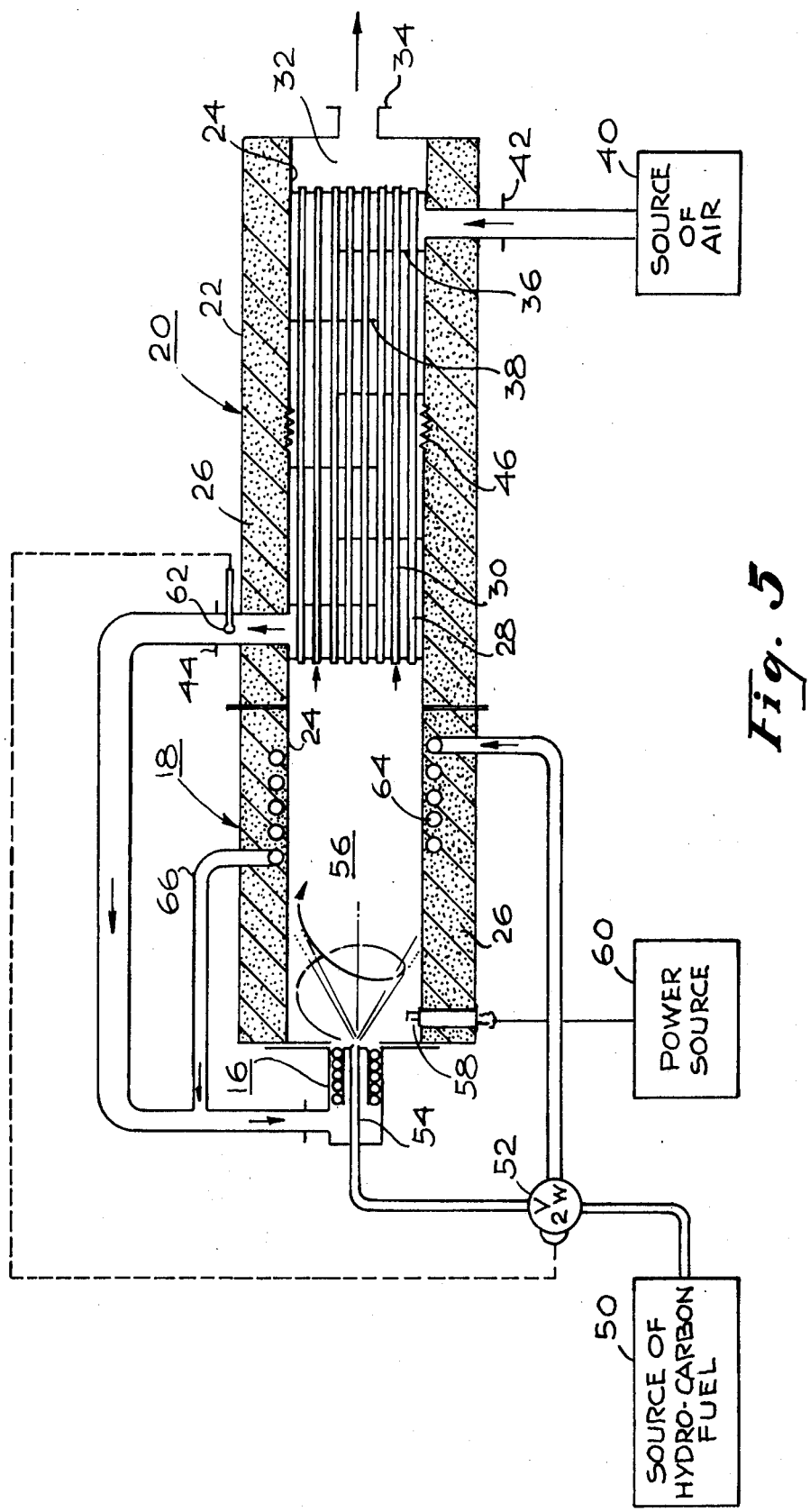
FIG. 5 illustrates in cross section, an embodiment of a hydrogen generator, in accordance with this invention.

FIG. 5 is a cross sectional and diagrammatic view of an embodiment of this invention. It basically comprises three parts. A burner section 16, a combustion section 18, and a heat exchanging section 20. The combustion chamber and heat exchange section together effectively constitute a hollow cylinder having an outer wall 22, an inner wall 24 spaced therefrom, and suitable insulation 26, such as cast ceramic, therebetween. The heat exchanging section 20 includes a plurality of hollow tubes, 28, 30, for example, which are spaced from one another and which extend from the combustion chamber to a collection space 32 leading to the exhaust flange 34.

A plurality of baffles, 36, 38, for example are spaced from one another and extend from opposite sides of the inner wall 24 in a manner so that air, which is introduced from a source of air 40, through an entrance flange 42, into the region of the heat exchanger, will follow a zigzag path through the space between the tubes 28, 30 until the air reaches an air exit flange 44, which is provided at the opposite end from the air entrance flange and the heat exchanger region. In this manner the air comes in contact with the tubes through which hot combustion gases pass. The baffles 36, 38, provide for cross flow of the air across these tubes and thus effectuate an effective heat transfer. An expansion bellows 46 in the internal wall eliminates thermal stress therein as well as in the tubes.

The air leaves the exit flange 44 and is directed into the burner 16. At startup, a liquid hydrocarbon fuel from a source 50, is pumped through a two way valve 52, into the burner 16. The burner has a startup nozzle 54, which emits a spray of liquid droplets into the combustion chamber 56 in the combustion section 18.

The air/fuel mixture in the combustion chamber is ignited by a sparkplug 58, which is powered from a power source 60. A partial oxidation reaction then occurs and produces hydrogen-rich product combustion gases which enter the tubes 28, 30, passing therethrough and exchanging heat with the incoming air so that the product gas which is emitted has been cooled down.

During start up, the air-fuel ratio is maintained above the vaporized fuel normal design value and in a region, as shown by curve 10, in which a soot-free operation occurs. There is a temperature sensor 62 in the air exit flange, and when this sensor detects the fact that a preset temperature value has been exceeded by the preheated air (a temperature above the liquid fuel dew point temperature), it controls the two way valve 52 to prevent further application of fuel to the start up nozzle in the burner, and instead supplies the fuel to a fuel vaporization coil 64. Changes in the amount of fuel delivered to the burner and to the vaporizer are determined by the sizes of the two way valve exit ports. The coil 64 is wound on the inner metal combustion shell or inner wall 24, and is imbedded in the insulation 26.

The vaporized fuel leaves the coil exit 66, and thereafter is mixed with the heated airstream coming out of the air exit flange 44. The premixed vaporized fuel/air stream now passes through the burner 16 into the combustion chamber, where partial oxidation of the fuel takes place to produce a hydrogen-rich gas. It should be noted, that when the two way valve 52 is switched to the vaporized fuel position, the air-to-fuel ratio is reduced to the operating value for vaporized fuel.

By way of illustration, and not to serve as a limitation on the invention, when the air preheat temperature reached 450° F the two way valve 52 was switched to feed fuel to the vaporization coil. In an embodiment of the invention which was built the preheated air temperature was permitted to reach 1200° F, producing a reaction temperature of 2400° F, producing a high hydrogen-rich product gas yield. Air preheat temperature may be determined, to a large extent, by the design of the heat exchanging section.

The hot inner wall or cylinder 24, is structurally a floating item and it is supported by the thermal insulation such as the cast ceramic insulator, which sets up a considerable temperature gradient so that the outer wall 22 is at a much lower temperature. The cold outer wall does seal the unit and provides structural strength.

The unit is shut down by shutting off the hydrocarbon supply pump first, allowing the air to remain on for a few seconds, thus purging the unit of hydrogen. This discourages a system of residual hydrogen-rich gases that may represent a potential safety hazard. There is insufficient mixing between the air and the hydrogen rich gas during this operation to have any appreciable heat release in the heat exchanger or in the line beyond.

If it is desired to operate the unit at an extremely low air/fuel ratio, where soot formation becomes a problem, water addition can be used for soot suppression. Water may be added in with the fuel at the entrance to the fuel vaporization coil. This applies to steady state operation. Start up would be accomplished in the manner described without water.

Figure 6:
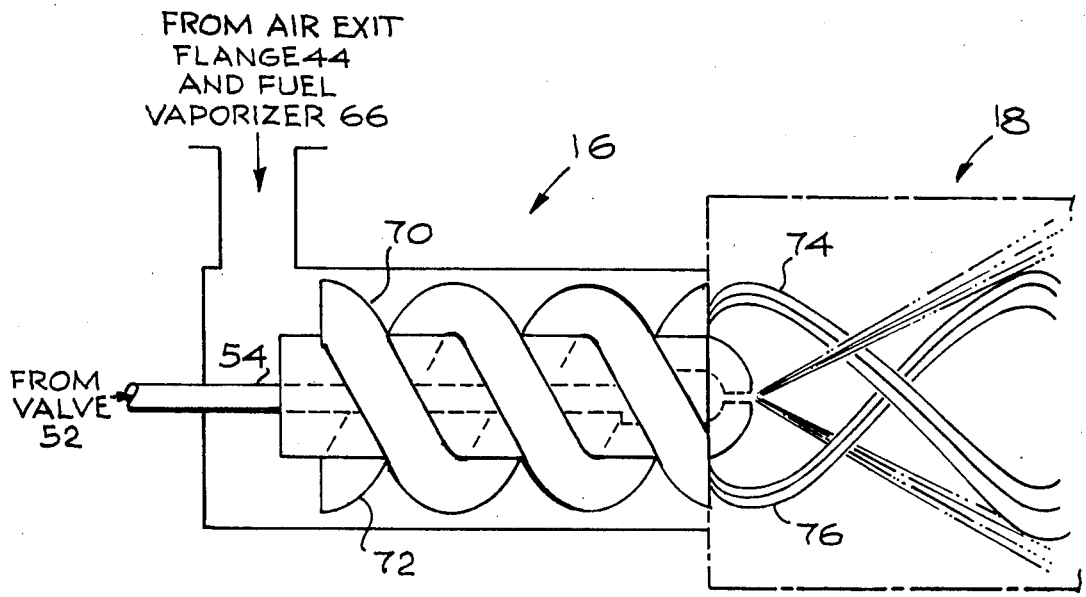
FIG. 6 is a view in cross section illustrating the type of injection nozzle employed with this invention.

FIG. 6 is an enlarged and detailed view, in cross section of the burner 16. The start up nozzle 54 is represented by the dashed central line. When the two way valve is operated to apply the hydrocarbon fuel to the vaporizing coil, then the premixed feed gases are directed into two helical tubes respectively 70, 72 and the two passages between the tubes, and are thereafter directed into the combustion chamber as a strongly outwardly rotating annulus of gas represented by four streams that merge as they come out, two of which are shown as 74, 76. The length of the flame that exists can be tailored by changing the angle of the helical path in the burner. A steeper angle results in a longer flame. There is a tradeoff between the length of flame and the fact that the longer flame keeps the hottest part of the flame in the center and off the walls of the combustion chamber.

Figure 7:
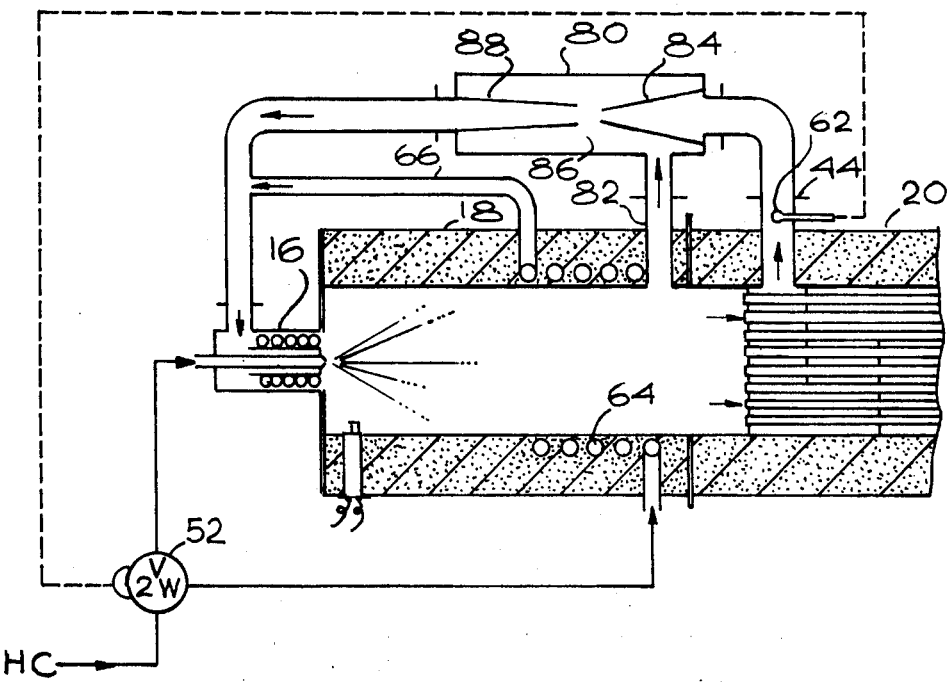
FIG. 7 is a cross sectional view illustrating an embodiment of the invention which feeds back product gas.

FIG. 7 is a cross sectional and schematic view of an embodiment of the invention which utilizes product gas for recirculation. The advantage of the use of product gas is that this dilutes the oxygen content of the air and modifies the reaction mechanism. The hydrogen in the producut gas also modifies the combustion reactions and increases flame stability. The combination of these factors suppresses carbon formation. The overall result is that the unit depicted in FIG. 7, utilizing product gas recirculation, can be operated at a lower air/fuel ratio without soot formation than the unit shown in FIG. 5. A lower air/fuel ratio represents a more efficient operating condition. It should be noted that product gas recirculation does not add any net energy to the generator as the product gas stream is at or below the adiabatic flame temperature.

The hydrogen generator unit shown in FIG. 7 is identical with the one shown in FIG. 6 except that a gas-gas aspirator 80 has been added. Also, an exit port 82 has been provided from the combustion zone, to permit the hydrogen product gas to flow to the aspirator 80. The preheated air flows from the heat exchanger exit flange 44, into a Venturi nozzle 84, whose converging sections produce a high air velocity at the terminal end thereof. The resulting high air velocity causes a low pressure region adjacent the Venturi nozzle throat, which aspirates the product gas from the product gas exit port 82 and causes it to be mixed in the nozzle 88, with the air stream. The mixture of air and product gas exits from the diverging sections of the nozzle 88 and thereafter is mixed with the vaporized fuel. The resulting stream enters the burner at the burner entrance flange.

The operation of the embodiment of the invention shown in FIG. 7 otherwise is the same as has been described for FIG. 6 and therefore will not be redescribed here.

Figure 8:
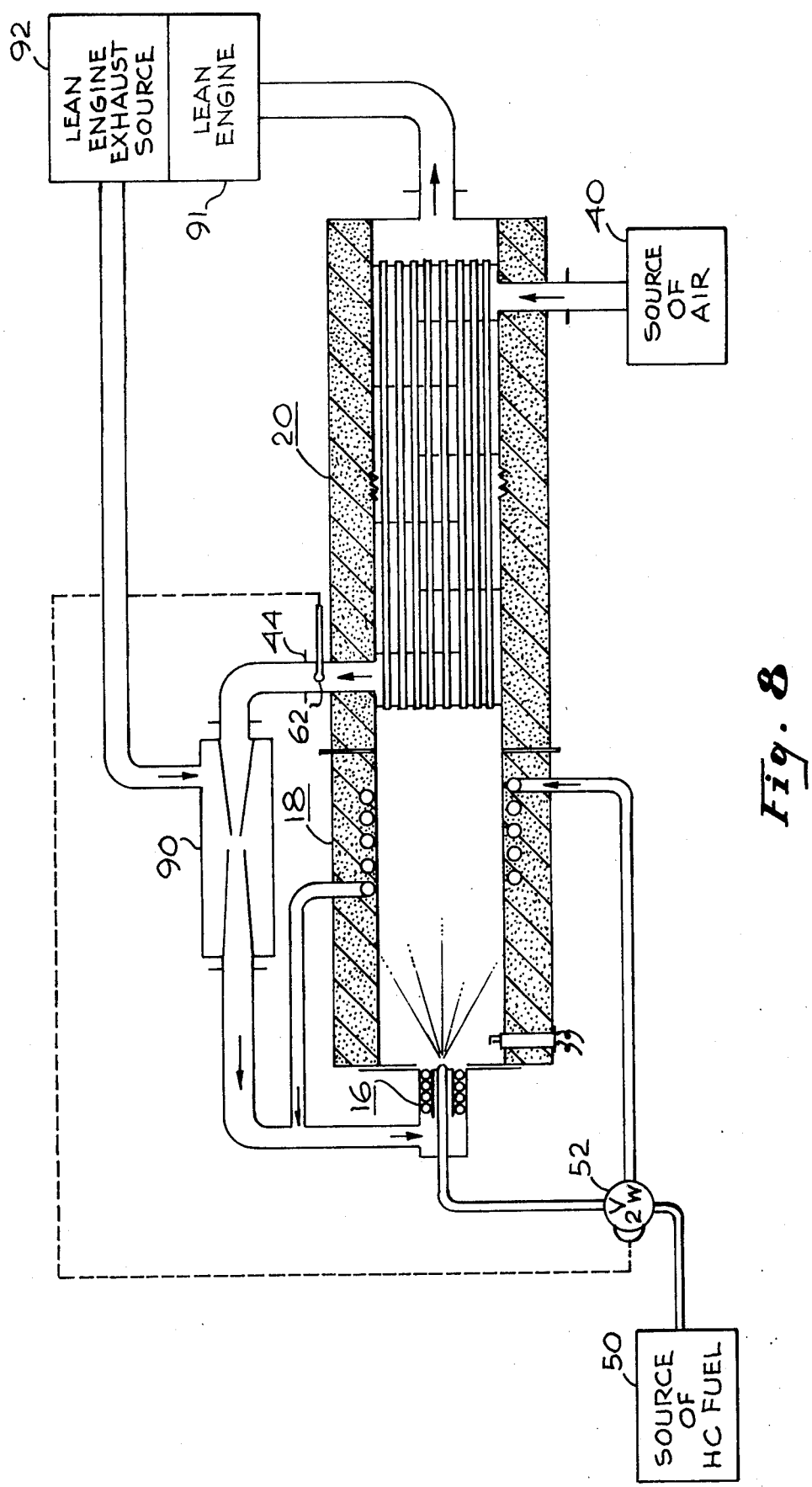
FIG. 8 is a cross sectional and schematic view of an embodiment of the invention which feeds back engine exhaust gas.

FIG. 8 illustrates an embodiment of the invention which mixes lean engine exhaust gas with the preheated air, instead of the product gas. The exhaust gas stream from an internal combustion engine, which may be operated at equivalent ratios of the order of 0.5, contains on the order of 10% by volume of oxygen, has a high water content (6 volume percent), and a high temperature (at least 1000° F). Consequently, this exhaust gas stream can replace a fraction of the generator air requirements and it also has advantageous properties of high water content and high preheat. However, care must be taken in how much of the exhaust gas is used since below an oxygen content of approximately 13 volume percent, gasoline is no longer flammable. This minimum required oxygen level decreases with increasing temperature.

An internal combustion engine of the type described in the Rupe application, Ser. No. 387,342, filed Aug. 10, 1973, previously mentioned herein, illustrates the type of engine whose exhaust products may be used. This is by way of illustration but not by way of a limitation of a suitable internal combustion engine.

It will be noted that the embodiment of the invention which is shown in FIG. 8 is substantially identical with the one shown in FIG. 7, as well as in FIG. 6 except that an aspirator 90, is coupled to receive the preheated air from the exhaust flange 44, as previously described. The other input into the aspirator 90 is received from the lean engine exhaust source of gases, 92. The exhaust gas is mixed with the preheated air and the aspirator output is then mixed with the vaporized fuel, and thereafter is applied to the burner. The operation of the embodiment of the invention shown in FIG. 8 is otherwise the same as was previously described. The unit depicted in FIG. 8 can be operated at a lower air/fuel ratio without soot formation, than the basic unit shown in FIG. 5.

Figure 9:
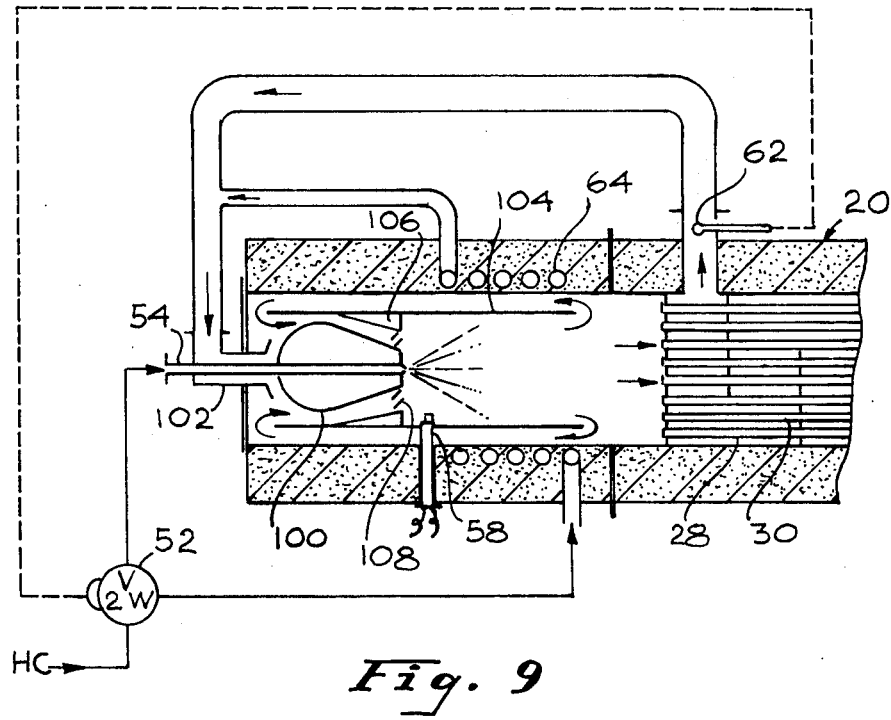
FIG. 9 is a cross sectional view of an embodiment of the invention illustrating the employment of a catalyst.

FIG. 9 shows an embodiment of the invention, in cross section, wherein the product gas which is fed back to be mixed with the incoming air/fuel mixture, is derived internally without leading the product gas out of the burner. This reduces the amount of air pressure required to obtain a certain amount of recirculation.

The unit is again started by introducing liquid hydrocarbon through a spray nozzle 54, which extends further into the combustion chamber than in the previous embodiments of the invention. It extends through a pear shaped body of revolution 100. Incoming preheated air is led by a suitable passageway 102, to the base of the pear shaped figure of revolution 100 over which it passes. A freestanding cylinder 104 supported from the walls by thin spokes, (not shown), is positioned within the combustion chamber. The walls of the cylinder, adjacent the surface of the figure of revolution, support inwardly flaring walls, 106, spaced from the walls of the figure of revolution to define a passageway therewith, and form a Venturi-like device. A set of vortex vanes 108 is positioned at the exit from this passageway to impart a vortex motion to the air flow.

Initially the spray of liquid fuel droplets is ignited, as before, by the spark plug 58 and hot combustion gases leave the combustion chamber through the tubes 28, 30.

The freestanding cylinder 104, provides an annular space between it and the walls of the combustion chamber through which product gas is recycled back to the low pressure throat region of the Venturi defined by the cylinder and the surface of the figure of revolution.

As before, when the air temperature sensed by the sensor 62 reaches a preset value the two way valve 52 is switched to transfer the liquid fuel to the vaporization coil 64, and now a mixture of vaporized fuel and hot air enters the combustion chamber to be converted into product gas, a portion of which is recycled back and mixed with the incoming fuel vapor/air mixture to be thereafter introduced into the combustion chamber cavity where the partial oxidation reaction takes place. Again, the main advantage of the unit shown in FIG. 9 over the standard unit of FIG. 5 is operation at lower air/fuel ratios without soot formation.

Figure 10:
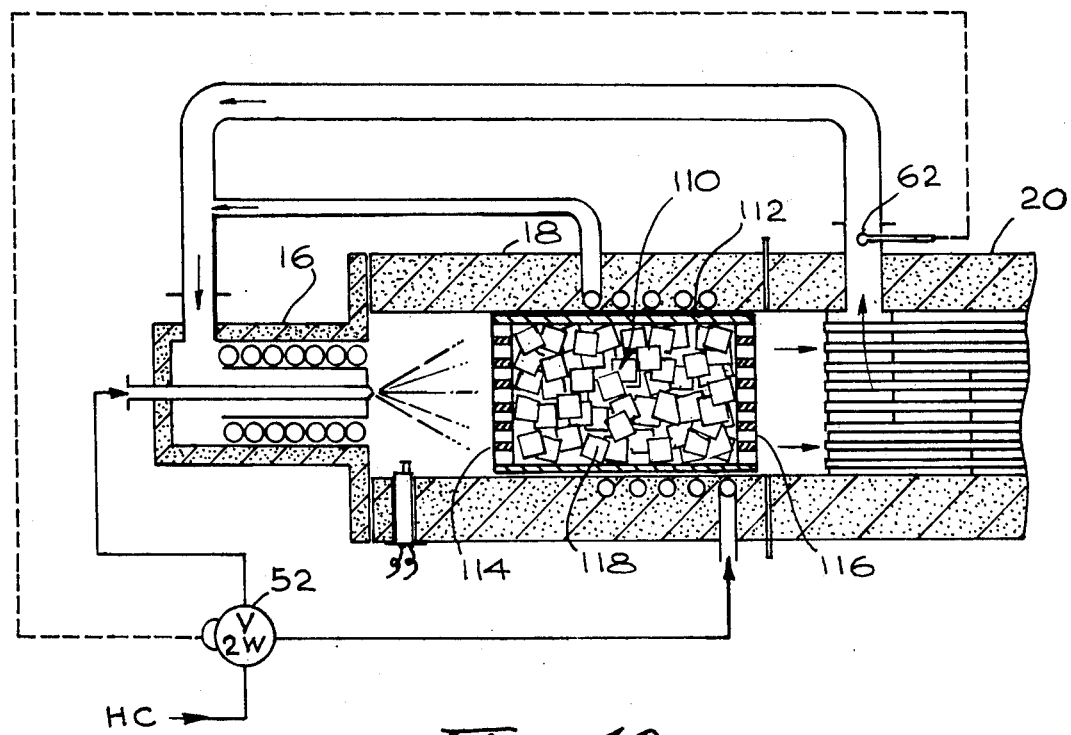

FIG. 10 is a cross sectional view of another and preferred embodiment of the invention. The hydrogen generator structure is the same as has been described for FIG. 5, with the difference that a catalyst is employed which produces several advantages, such as higher hydrogen yield and no tendency to form soot even at very low air/fuel ratios. Also, much lower operating temperatures (1800° F) are permitted whereby lower air preheat requirements (450° F) permit a smaller heat exchanger.

Adjacent the region where combustion takes place, during startup, there is placed a catalytic bed 110 comprising a cylinder 112, which has a perforated top wall 114 and a perforated bottom wall 116 to permit the hot gases to flow therethrough into the heat exchange section 20. The catalyst bed contains particles 118, of a partial oxidation catalyst such as nickel deposited on a substrate, such as aluminum, which serves to speed up the partial oxidation reaction of the hydrocarbon with air to yield a hydrogen-rich gas. It has also been found that the nickel catalyst has a strong soot suppressing action. Other partial oxidation catalysts such as palladium, platinum or silver oxide may also be used for the reaction of hydrocarbon and air. In principle any of the known oxidation type catalysts for the reaction of oxygen and a hydrocarbon can be used. The particular form of catalysts used here fall in the category of steam reforming catalysts, however in this invention the reaction is of oxygen and a hydrocarbon rather than of steam and a hydrocarbon.

It has been noted that upon start up, the generator with a catalyst bed operates in a similar manner to the generators previously described. That is, there is a burning of the vaporized fuel in the vicinity of the burner. As the catalyst bed heats up towards the operating temperature (beyond 900° F), the flame gradually moves into the catalyst bed. When a steady state temperature of 1800° F is reached, there is no visible flame present. The partial oxidation process takes place entirely on the surfaces of the catalyst. The catalyst may be in the form of pellets or in the form of a monolythic structure.

By way of illustration, and not by way of a limitation upon the invention, an embodiment of the invention was built and operated with an input air flow rate of 45.6 pounds per hour, and a fuel flow of 8.9 pounds per hour. The air/fuel ratio was 5.15 with an equivalence ratio of 2.83. Generator pressure was 1.4 psig. The catalyst temperature was measured at 1774° F.

With the above input 1.06 pounds per hour of $H_2$ was obtained, along with other components. The exit pressure was 1.0 psig, and the generator thermal efficiency was 0.785. The output can be increased by increasing the input and an $H_2$ output flow rate as high as 2 pounds per hour was thus obtained. The dimensions of the generator that was built and performed as above are 15 inches long and 6 inches in diameter, which includes the heat exchanger.

Any hydrocarbon that can be vaporized and mixed with air without decomposition may be usued with the embodiment of the invention. It is obvious that the higher the hydrogen to carbon atomic ratio of the fuel that is used, the higher the hydrogen yield will be.

The catalytic hydrogen generator, in accordance with this invention has the following advantages over the previous thermal units.

1. There is a higher hydrogen yield.
2. There is no tendency to form soot, even at low air/fuel ratios. The product is absolutely soot free.
3. The generator has lower operating temperatures, allowing the use of less expensive construction materials.
4. Lower air preheat requirements reduce the size of the heat exchanger that is required. As a result, a more compact design of the hydrogen generator is achievable making it suitable for automobile use.

There has accordingly been described herein, a novel useful and improved hydrogen generator.

We claim:

1. A hydrogen generator comprising
 means for defining a source of liquid hydrocarbon,
 means for defining a source of air,
 means establishing a partial oxidation region,
 means to which said means defining a source of liquid carbon is connected for producing a spray of droplets from said liquid hydrocarbon source and injecting said spray into said partial oxidation region,
 means for injecting air from said means defining a source of air into said partial oxidation region to be mixed with said spray,
 means to which said partial oxidation region is connected for igniting said air-spray mixture to permit production of hot hydrogen-rich product gases,
 means to which said means defining a source of air is connected for preheating air from said source prior to its injection into said partial oxidation region with said hot hydrogen-rich product gases,
 means coupled to said means for preheating air for determining when the temperature of said preheated air exceeds a predetermined value and producing a signal,
 means coupled to said means defining a source of liquid hydrocarbon for vaporizing said liquid hydrocarbon,
 valve means responsive to said signal for terminating the application of liquid hydrocarbon from said source to said means for producing a spray of droplets and for directing it instead to said means for vaporizing liquid hydrocarbon to produce vaporized hydrocarbon,
 means for directing said vaporized hydrocarbon to said means for injecting air to be mixed with said preheated air and injected therewith into said partial oxidation regions, and
 means for removing hydrogen-rich product gases from said partial oxidation region.

2. A hydrogen generator as recited in claim 1 wherein there is included means for mixing some of said hydrogen-rich product gases from said partial oxidation region with said preheated air and said vaporized hydrocarbon.

3. A hydrogen generator as recited in claim 1 wherein there is included catalyst means positioned within said means establishing a partial oxidation region for partially oxidizing the vaporized fuel on the surfaces of said catalyst means.

4. A hydrogen-rich generator as recited in claim 3 wherein said catalyst means is one of a group consisting of nickel, palladium, platinum and silver oxide.

5. A hydrogen generator comprising walls defining a chamber, said chamber having a separate preheating section and a burner section,
means defining a source of air,
means for passing air from said means defining a source of air through said preheating section to be preheated,
means defining a source of liquid hydrocarbon,
burner means for injecting preheated air from said preheating section and a spray of liquid hydrocarbon from said means defining a source of liquid hydrocarbon into said burner section,
vaporizing means for forming a vaporized hydrocarbon from said liquid hydrocarbon,
means coupling said means defining a source of liquid hydrocarbon to said burner means including a valve means having a first position for directing said hydrocarbon fuel to said burner means and a second position for directing said hydrocarbon to said vaporizing means,
temperature sensing means for sensing the temperature of said preheated air and switching said valve means to its second position when it senses a temperature in excess of a predetermined level,
means for applying said vaporized hydrocarbon and said preheated air to said burner means to be mixed thereby and injected into said burner section,
igniter means adjacent the burner means in said combustion section for igniting the air-hydrocarbon output from said burner means whereby a partial oxidation of said hydrocarbon can occur with the production of hot hydrogen-rich product gases, and
means for passing said hot hydrogen-rich product gases from said combustion section through said preheating section for preheating said air.

6. A hydrogen generator as recited in claim 5 wherein said valve means includes a first exit port in the path of hydrocarbon fuel through said valve means to said burner means and a second exit port in the path of said fuel through said valve means to said vaporizer means,
said second exit port opening being greater than said first exit port opening.

7. A hydrogen generator as recited in claim 5 wherein there is included means to mix a portion of said hydrogen-rich product gases from said partial oxidation region with said mixture of vaporized hydrocarbon and air.

8. A hydrogen generator as recited in claim 7 wherein said means to mix a portion of said hydrogen-rich product gases with said mixture of vaporized liquid hydrocarbon and air includes
aspirator means having two inputs and an output,
means coupling one of said aspirator means inputs to receive preheated air from said preheater section and the other of said aspirator means inputs to receive hydrogen-rich gases from said burner section, and
means coupling said aspirator means output to said burner means.

9. A hydrogen generator as recited in claim 5 wherein there is included catalyst means placed in said burner section having surfaces over which gases in said burner section pass to said preheat section to be generated into hot hydrogen-rich product gases.

10. A hydrogen generator as recited in claim 9 wherein said catalyst means is one of a group consisting of nickel, palladium, platinum and silver oxide.

11. A hydrogen generator as recited in claim 5, wherein said vaporizing means comprises tubing wrapped around the walls defining said burner section.

12. A hydrogen generator as recited in claim 5 wherein said burner means includes
a pear shaped body positioned with its narrower end adjacent one end of said burner section and its other end extending into said burner section,
central passageway means passing through the center of said pear shaped body for injecting said liquid hydrocarbon spray into said burner section,
first passageway means for guiding said preheated air over said pear shaped body surface and into said burner section, including
a hollow cylinder within said burner section, said hollow cylinder enclosing said pear shapped body and extending into said burner section, and
means extending from the inside walls of said hollow cylinder toward the surface of said pear shaped body to form said first passageway means therewith,
said hollow cylinder outside walls being spaced from said chamber walls to define a second passageway therewith for returning some of said hydrogen-rich product gases to said first passageway to be mixed with said air and vaporized hydrocarbon fuel.

13. A hydrogen generator as recited in claim 5 wherein said burner means includes central passageway means for injecting liquid hydrocarbon fuel spray, and
spiral passageway means surrounding said central passageway means for injecting air into said burner section when said valve means is in its first position and a mixture of air and vaporized liquid hydrocarbon when said valve means is in its second position.

14. The method of producing hydrogen-rich product gases from liquid hydrocarbon comprising
providing a stream of air,
generating a spray of a first portion of said liquid hydrocarbon,
mixing a spray of said liquid hydrocarbon with said stream of air to produce a first mixture,
partially oxidizing said first mixture to produce hydrogen-rich hot product gases,
heating said stream of air prior to mixing with said liquid hydrocarbon spray by indirect heat exchange with the hydrogen-rich hot product gases to produce heated air,
measuring the temperature of said heated air and producing a signal when it exceeds the dewpoint of said liquid hydrocarbon,
vaporizing a second portion of said liquid hydrocarbon to produce a vaporized hydrocarbon, and
mixing said vaporized hydrocarbon with said heated air in place of said spray in response to said signal, and partially oxidizing said mixture of vaporized hydrocarbon with said heated air instead of said first mixture to produce hydrogen-rich product gases.

15. The method as recited in claim 14 wherein there is included the step of mixing some of said hydrogen-rich product gases with said mixture of vaporized hydrocarbon and preheated air.

16. The method as recited in claim 14 wherein said step of partially oxidizing said first mixture includes the step of igniting said mixture in a confined space and thereafter passing over the surfaces of a catalyst.

17. The method as recited in claim 16 wherein said catalyst is one of the group consisting of nickel, platinum and silver oxide.

\* \* \* \* \*